United States Patent [19]

Perol

[11] Patent Number: 5,729,444
[45] Date of Patent: Mar. 17, 1998

[54] HIGH-EFFICIENCY DC-DC CONVERTER

[75] Inventor: Philippe Alfred Perol, PD Den Haag, Netherlands

[73] Assignee: Agence Spatiale Europeenne, Paris, France

[21] Appl. No.: 451,190

[22] Filed: May 26, 1995

[30] Foreign Application Priority Data

May 27, 1994 [FR] France .................. 94 06458

[51] Int. Cl.⁶ .................................................. H02M 3/335
[52] U.S. Cl. ........................................ 363/25; 363/24
[58] Field of Search .............................. 363/24, 25

[56] References Cited

U.S. PATENT DOCUMENTS

| | | | |
|---|---|---|---|
| 3,843,919 | 10/1974 | Yamamura et al. | 363/25 |
| 3,938,024 | 2/1976 | Clarke | 363/24 |
| 4,025,863 | 5/1977 | Higuchi et al. | 363/25 |
| 4,301,499 | 11/1981 | Levinson | 363/26 |
| 4,443,840 | 4/1984 | Geissler et al. | 363/24 |
| 4,885,675 | 12/1989 | Henze et al. | 363/26 |
| 4,959,765 | 9/1990 | Weinberg | 363/24 |

FOREIGN PATENT DOCUMENTS

| | | |
|---|---|---|
| 2627644 | 2/1988 | France . |
| 2658674 | 2/1990 | France . |
| 9007381 | 10/1989 | WIPO . |

OTHER PUBLICATIONS

Pesc'92 Record, 29 Jun. 1992, Toledo, Spain—pp. 1001–1010, XP000369120 Weinberg "A Novel Lossless Resonant MOSFET Driver".

*Primary Examiner*—Stuart N. Hecker
*Attorney, Agent, or Firm*—Sughrue, Mion, Zinn, Macpeak & Seas, PLLC

[57] ABSTRACT

A DC-DC converter includes a transformer with two oppositely-wound primary windings, one on each side of a center tap, and at least one secondary winding connected to a load having a given capacitance. A reference voltage source is connected to the center tap of the transformer via an inductor so that the transformer is driven by a current source. Two switching devices are each connected in the return path of the reference voltage and in series with a respective primary winding. A control unit alternately and periodically connects the return path for the reference voltage to one or other of the primary windings. The control unit includes an oscillator generating squarewave signals has two complementary outputs connected directly to a control terminal of a respective switching device. The frequency of the oscillator is substantially equal to the resonant frequency of a circuit comprising the secondary inductance of the transformer and the capacitance of the load.

23 Claims, 4 Drawing Sheets

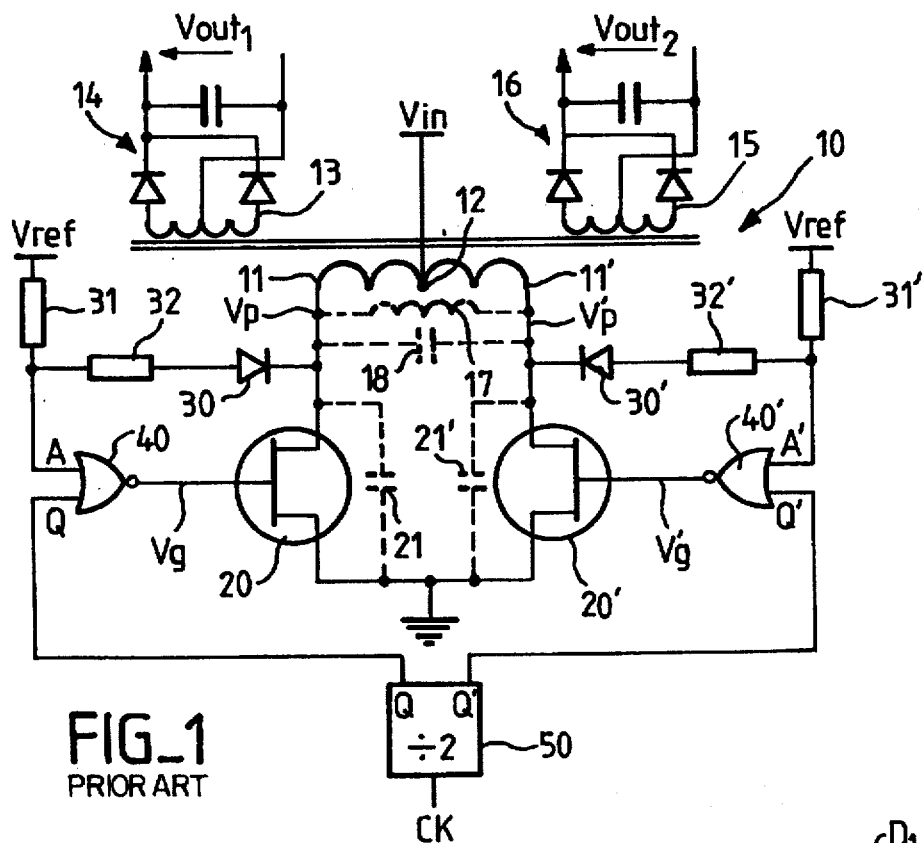
FIG_1 PRIOR ART
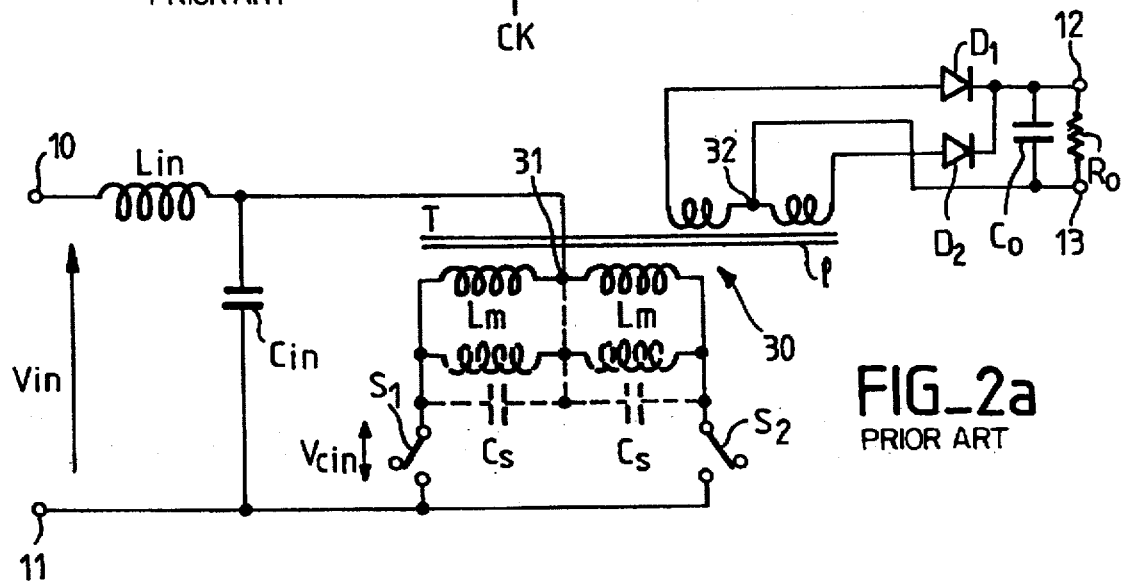
FIG_2a PRIOR ART
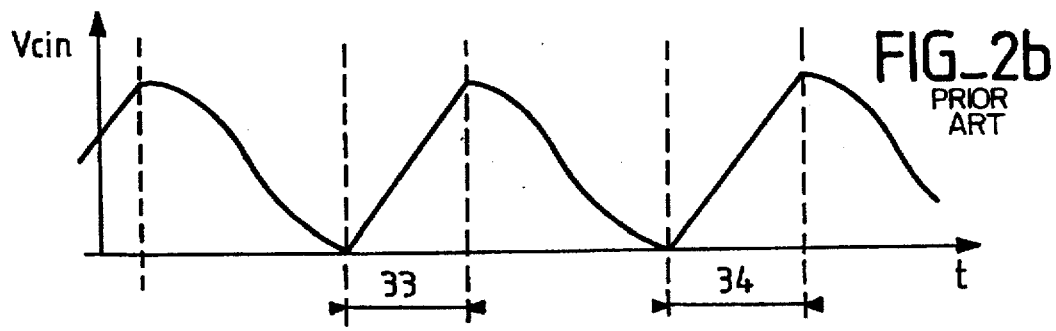
FIG_2b PRIOR ART

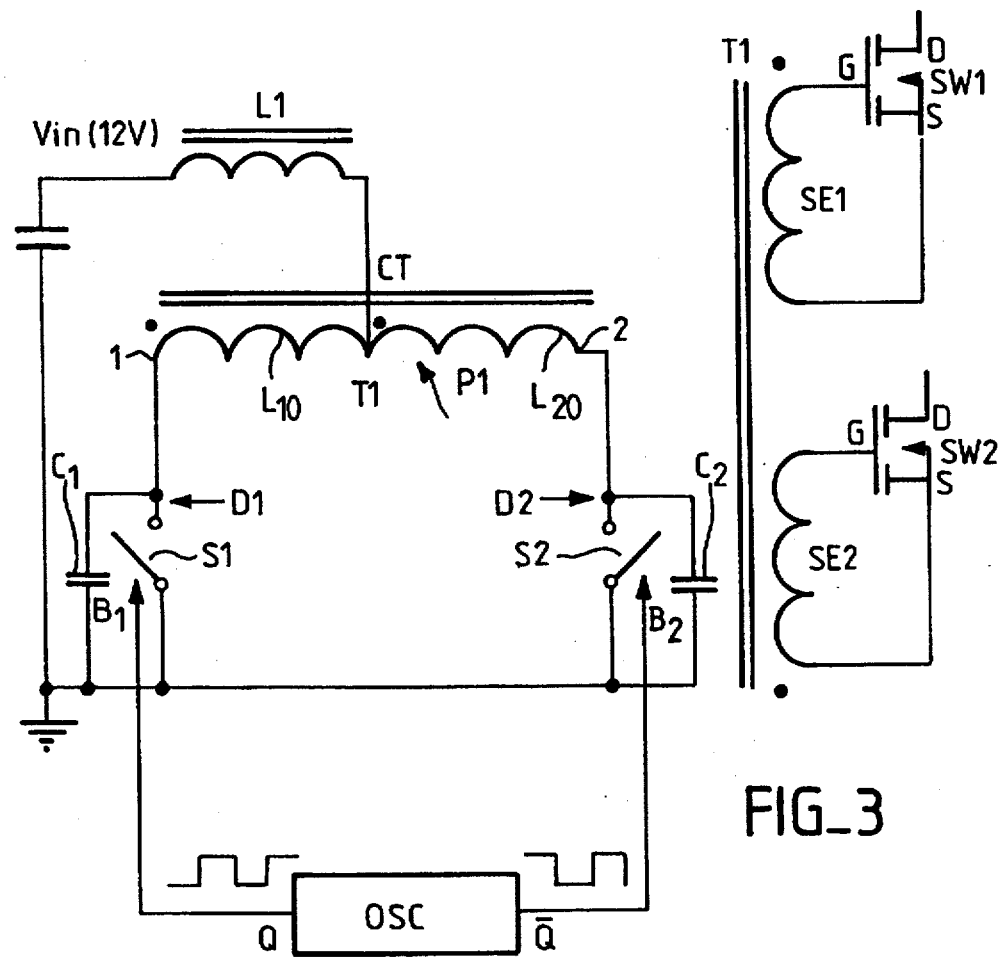
FIG_3
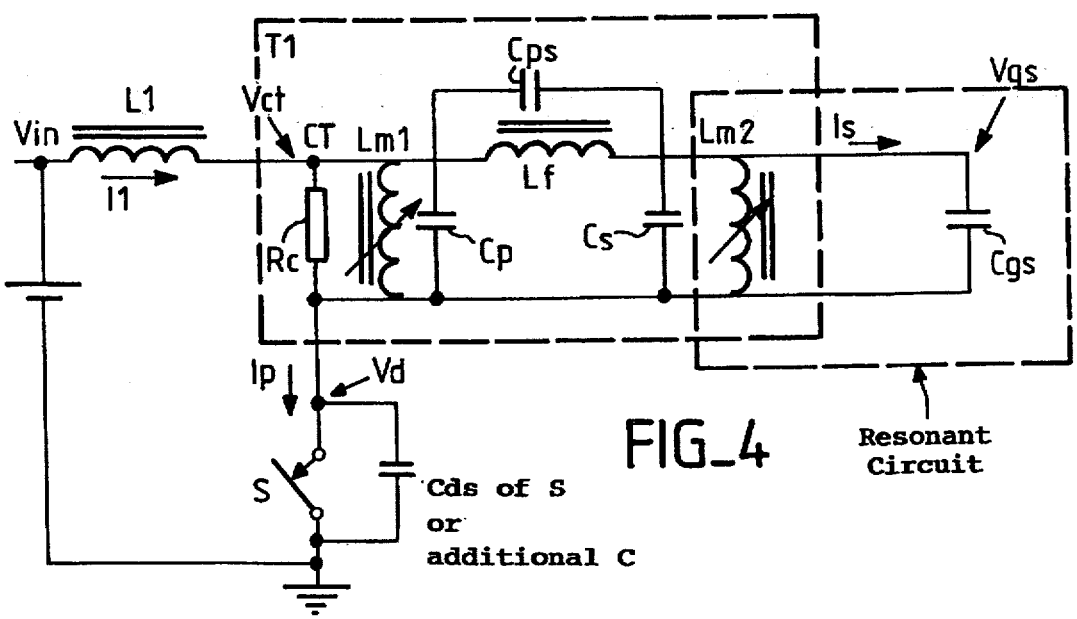
FIG_4
Resonant Circuit

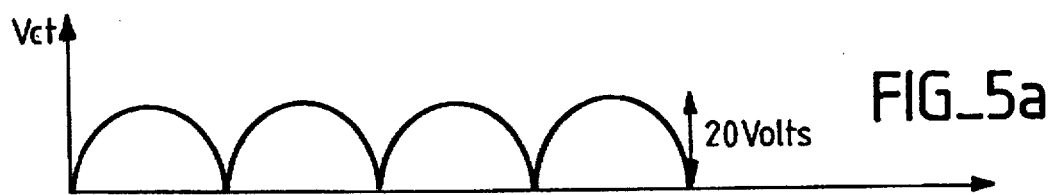
FIG_5a
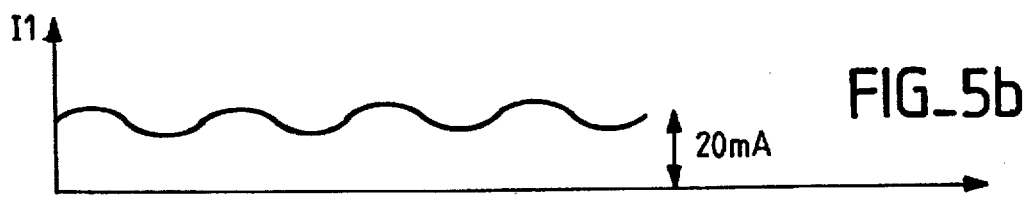
FIG_5b
FIG_5c
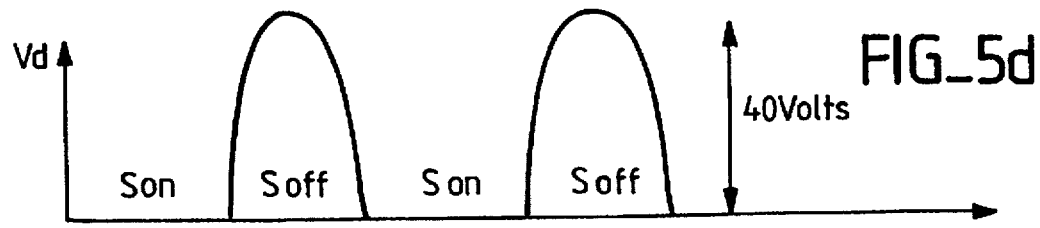
FIG_5d
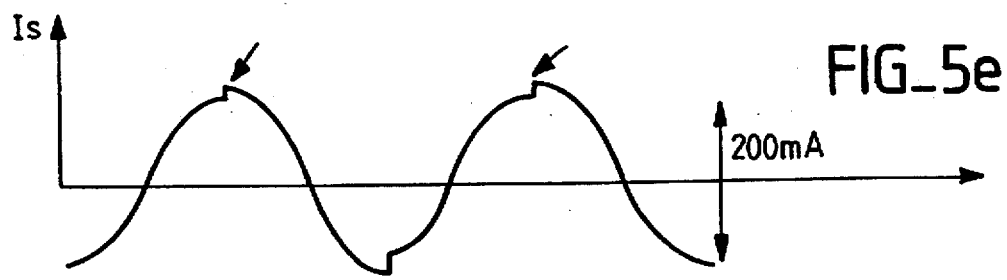
FIG_5e
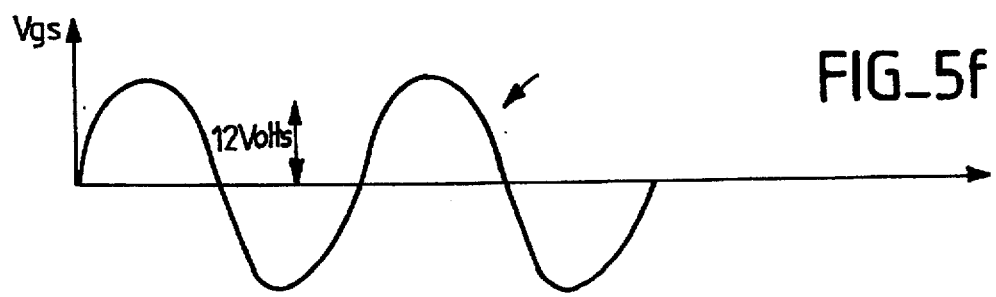
FIG_5f FIG_6
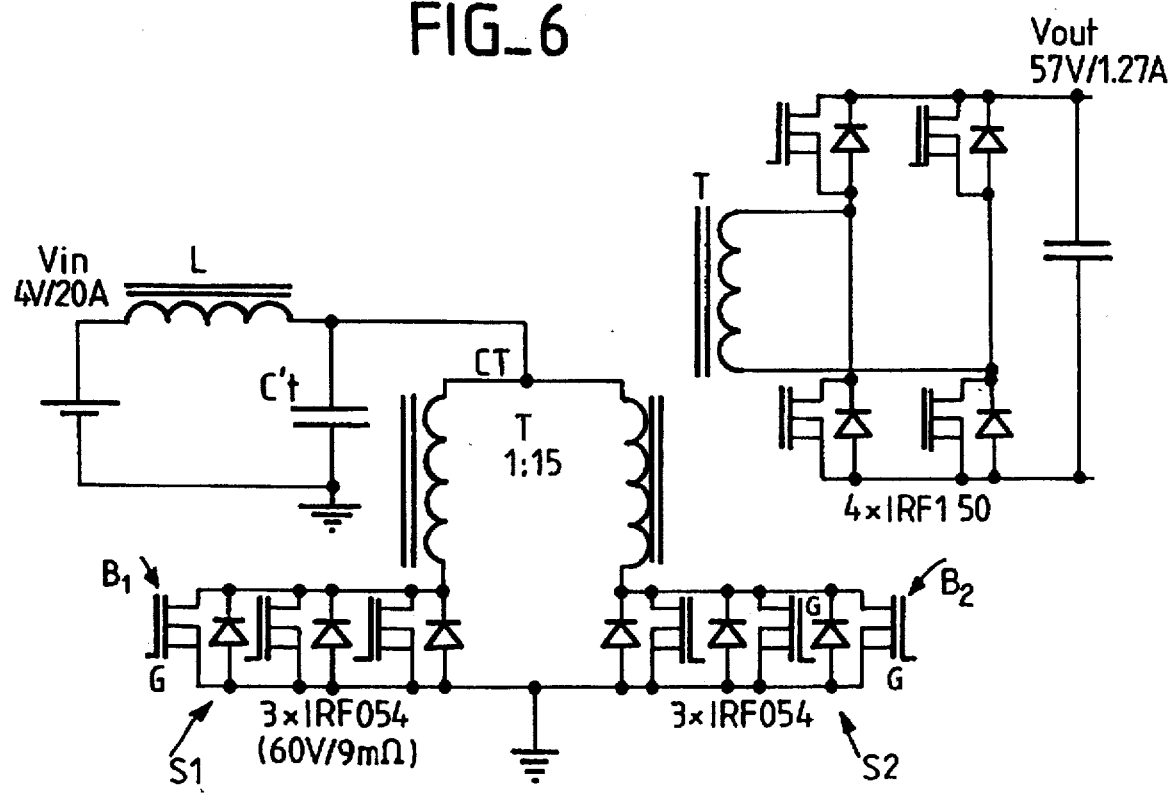
FIG_7
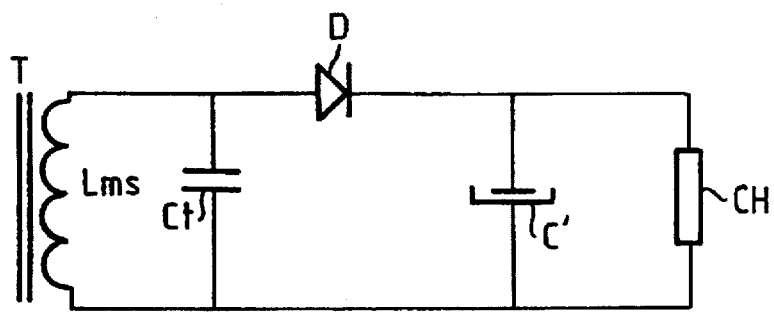

HIGH-EFFICIENCY DC-DC CONVERTER

BACKGROUND OF THE INVENTION

1. Field of the Invention

The present invention concerns a DC-DC converter of the type comprising a transformer with two oppositely wound primary windings, one on each side of a center tap, and at least one secondary winding connected to a load having a given capacitance, a reference voltage source connected to the transformer center tap via an inductor so that the transformer is driven from a current source, two switching devices each connected in the return path for the reference voltage and in series with a respective primary winding and control means for alternately and periodically connecting the return path for the reference voltage to one or other of the primary windings.

2. Description of the Prior Art

A converter of this kind is described in French patent application FR-A-2 658 674 published Aug. 23, 1991 and filed by the Applicant on Feb. 20, 1990. This converter includes means for automatically adjusting the dead time during which both switches are open. This entails comparing the voltage across each primary winding with a reference potential and the use of inhibiting means to prevent one switch being closed after the other is opened for as long as the primary winding voltage corresponding to the first switch has not dropped below the reference potential. Further, the voltages at the terminals 11 and 11' of the primary winding are trapezoidal signals which is not the optimum for the overall energy balance of the converter.

Another converter of this kind is described in French patent application FR-A-2 627 644 published Aug. 25, 1989 and filed by the Applicant on Feb. 24, 1988. In this converter a capacitor C and a series inductor L constitutes a resonant circuit when the switch means are closed. The current flowing through the closed switch is a semi-sinusoid. The voltage across the capacitor falls sinusoidally. When the aforementioned current reaches zero, a forward-biased diode is turned off and maintains a zero current. The switch can then be opened with no switching losses. When the switch is open the voltage source charges the previously mentioned shunt input capacitor, the high value of the input inductance imitating the inrush current charging the capacitor so that charging takes place at constant current. This eliminates switching losses both on opening the circuit and on closing it. However, the fact that the current is practically sinusoidal has a direct effect on the form factor of the current and on conduction losses. In particular, if MOS field effect transistors are used for the switching devices, when they are turned on they are equivalent to a resistor and are therefore sensitive to the mean value of the current. The efficiency of a circuit of this kind is not optimum because of driving losses.

An object of the present invention is to provide a DC-DC converter which does not have the aforementioned drawbacks and which in particular provides a high efficiency by substantially reducing driving losses in a converter of the type described in patent application FR-A-2 627 644 or a similar type, more generally, any resonant converter with a pseudosinusoidal current.

The basic idea is to use a control circuit with the minimum number of components, essentially magnetic in nature and having intrinsic galvanic isolation, a sinusoidal signal being generated at the load.

The article "A NOVEL LOSSLESS RESONANT MOSFET DRIVER" by S. M. WEINBERG (IEEE 1992—P 1003–1010) describes a converter using two separate resonant circuits to charge and discharge the gates of an MOS transistor in the secondary circuit which is not driven by a sinusoidal signal. This circuit also includes diodes generating further losses to which the present invention is not subject.

SUMMARY OF THE INVENTION

The invention consists in a DC-DC converter of the type comprising a transformer with two oppositely-wound primary windings, one on each side of a center tap, and at least one secondary winding connected to a load having a given capacitance, a reference voltage source connected to said center tap of said transformer via an inductor so that said transformer is driven by a current source, two switching devices each connected in the return path of said reference voltage and in series with a respective primary winding and control means for alternately and periodically connecting said return path of said reference voltage to one or other of said primary windings, consisting of an oscillator generating squarewave signals and having two complementary outputs which are connected directly to a control terminal of a respective switching device, the frequency of said oscillator being substantially equal to the resonant frequency of a circuit comprising the secondary inductance of the transformer and said capacitance of said load.

In accordance with the invention, the switching devices can be MOS field effect transistors, their equivalent drain-source capacitance constituting a capacitor for storing the energy in the input inductor L1 during switching.

The switching devices can be bipolar transistors with a capacitor connected between their collector and their emitter and constituting a capacitor for storing the energy in the input inductor L1 during switching.

The storage capacity of the switching devices enables current flow to be maintained even when the switches are open, which is of benefit because the center tap of the transformer is supplied with current by the inductive component.

The load is advantageously a capacitive load, for example the gate-source capacitance of a power MOSFET.

The load can include a capacitor in parallel with the secondary winding to achieve resonance and, in some applications of the invention, an output capacitor connected across the resonant circuit capacitor via a forward-biased diode.

In another aspect the present invention consists in a DC-DC converter module comprising a transformer with a primary winding having first and second terminals and at least one secondary winding connected to a load having a given capacitance, a reference voltage source having a first terminal connected to the first terminal of the primary winding via an inductor L1 so that the transformer is driven by a current source, a switching device connected in series between a second terminal of the reference voltage source and the second terminal of the primary winding and control means for periodically connecting the second terminal of the reference voltage source to the second terminal of the primary winding, consisting of an oscillator having an output generating squarewave signals and connected directly to a control terminal of the switching device, characterized in that the oscillator frequency is substantially equal to the resonant frequency of a circuit comprising the inductance of the secondary winding and said capacitance of the load.

Other features and advantages of the invention will emerge more clearly from the following description given by way of non-limiting example with reference to the drawings.

BRIEF DESCRIPTION OF THE DRAWINGS

FIG. 1 shows a DC-DC converter in accordance with the previously mentioned French patent application FR-A-2 658 674.

FIGS. 2a and 2b respectively show a block diagram and a timing diagram for the DC-DC converter according to the aforementioned French patent application FR-A-2 627 644.

FIG. 3 shows one embodiment of the invention.

FIG. 4 shows an equivalent circuit for the FIG. 3 circuit for half-wave operation.

FIGS. 5a through 5f show timing diagrams of the invention respectively corresponding to the voltage Vct, the current I1, the current Ip, the voltage Vd, the current Is and the voltage Vs as shown in FIG. 4.

FIG. 6 shows a converter according to French patent application FR-A-2 672 644 in which the circuit of the invention can be used with particular benefit to control the transistors.

FIG. 7 shows an alternative embodiment of the secondary load for the transformer of the converter in accordance with the invention shown in FIG. 3.

DETAILED DESCRIPTION OF THE INVENTION

Referring to FIG. 1, a converter according to French patent application FR-A-2 658 674 includes a transformer with two oppositely wound primary windings 11, 11', one on each side of a center tap 12, and one or more secondary windings in which the AC voltage is produced. In the example shown in the figure the transformer has two secondary windings 13, 15 connected to respective rectifier and filter means 14, 16 to produce respective output voltages VOUT1 and VOUT2.

Each primary winding 11, 11' cooperates with a respective switching device 20, 20' which can be an MOS field effect transistor, as shown in the figure. The figure shows in dashed outline a magnetizing inductance 17 of the transformer, the stray capacitances 18 between the turns of the transformer and the stray capacitances 21, 21' between the drain and the source of the switches 20, 20' when the latter are open.

The center tap 12 is connected to a DC voltage source VIN supplying power to the converter, the other terminal (distal terminal) of each primary winding 11, 11' being selectively grounded via the respective switch 20, 20'.

The two switches 20, 20' receive respective control signals Vg, Vg' on their gate such that they operate in push-pull mode, i.e. for it to be possible to close one of the switches the other switch must be open.

Each half of the push-pull circuit includes, in a symmetrical arrangement, a respective diode 30, 30' the cathode of which is connected to the distal terminal of the corresponding winding 11, 11' and the anode of which is connected to a reference potential Vref via a series combination of resistors 31, 32 and 31', 32'. The common point of the two resistors is connected to one input of a respective NOR gate 40, 40' to which a signal A, A' is applied, the other input receiving one of two complementary signals Q, Q' produced by a frequency divider 50 receiving the external clock signal CK.

This circuit arrangement produces the trapezoidal waveform voltage Vp driving the transformer at the primary terminals 11 and 11'.

As mentioned above, this circuit does not offer optimum efficiency because of the power consumed by the control circuit.

Referring now to FIG. 2a, which corresponds to the converter in accordance with French patent application FR-A-2 627 644 previously mentioned, this converter comprises an isolating transformer 30 the primary and secondary windings of which have respective center taps 31, 32.

An input inductor Lin is connected to the primary at the center tap 31. A shunt input capacitor Cin is connected to the output of the input inductor Lin. The capacitor Cin and the series inductor Lm resonate when the switch means S are closed. The switch means S are disposed between the input capacitor Cin and the series inductor Lm and are driven by a periodic switching control circuit. When one switch is closed, the capacitor Cin discharges into the output capacitor Co with a sinusoidal waveform because the capacitor Cin and the inductor Lm constitute a series resonant circuit.

In push-pull operation, the periods 33, 34 (FIG. 2b) in which both switches S1, S2 are open enable charging of the shunt input capacitor Cin from the supply Vin, the transformer 30 reversing its polarity because of the energy accumulating in the magnetizing inductance Lm. This reversing of the voltage is commanded by the parallel resonant circuit comprising the magnetizing inductance Lm and the leakage capacitance Cs of the transformer 30. Thus, as already mentioned, this topology produces a pseudosinusoidal current in the switch (see FIG. 2b) which has the drawback of high conduction losses. To reduce these conduction losses larger transistors or a plurality of transistors connected in parallel can be used, but then the control circuit consumes a significant amount of energy. This problem can be solved using the circuit of the invention described below to drive the transistors.

The circuit of the invention is shown in FIG. 3. Note that this circuit can be used in a push-pull application or a half-bridge application. It includes a transformer T1 the primary P1 of which includes two oppositely wound windings $L_{10}$ and $L_{20}$, one on each side of a center tap CT. The ends 1 and 2 of the two oppositely wound windings are connected to respective switches S1 and S2 with control terminals B1 and B2 connected to an oscillator OSC generating complementary squarewave signals Q and $\bar{Q}$. The other terminal of the switches S1 and S2 is connected to the common mode pole (ground). The center tap CT is connected to a voltage source (supply voltage Vin=12 V, for example) via an inductor L1. The secondary of the transformer shown in the example has two windings SE1 and SE2 driving two field effect transistors SW1 and SW2. These transistors are power MOS transistors (IRF 150 devices, for example) which have a gate-source capacitance Cgs forming a capacitive load. The switches S1 and S2 can be small MOSFET (IRF 110 devices, for example) the gates G of which constitute the terminals B1 and B2. In this case the transistors have a drain-source capacitance Cds constituting an input capacitance of the switches. If the switches are not field effect transistors which have this intrinsic capacitance, low-value (100 pF) capacitors C1 and C2 are connected in parallel with the switches. The oscillators drive the switches S1 and S2 with a duty cycle ratio of 50% (squarewave signals). A 4047 CMOS multivibrator can be used for this purpose, with a 4049 or 4050 CMOS interface circuit on its output side. The switching frequency of the oscillator is the same as that chosen for the converter, the transistors SW1 and SW2 of which constitute the switches. The transistors SW1 and SW2 are seen as capacitors Cgs by the control circuit. For the transistors SW1 and SW2 the gate-source capacitance Cgs is the dominant capacitance. The gate-drain capacitance Cgd, also known as the Miller capacitance, shunts the latter and has a much lower value, usually in the order of 10% of Cgs. All these capacitances are inherently non-linear, but this is of little consequence when they are used in a resonant circuit, given in particular that Cgs varies slowly with the voltage. It can be assumed that for a given transistor the values of the these capacitances are known and clearly defined.

The control circuit is a resonant circuit in which resonance is obtained between the magnetizing inductance of the secondary windings of the transformer T1 and the capacitances of the power transistors SW1 and SW2 seen in parallel. Each capacitance of each MOS field effect transistor SW1 and SW2 is charged and discharged alternately and in a resonant manner. A sinusoidal voltage results at the gate of the transistors SW1 and SW2. This circuit is free of losses since all of the current flows in the secondary of the transformer and only a low current flows through the inductor L1 to compensate the damping losses of the oscillator comprising the inductance Lm2 of the transformer and the Cgs capacitances of the transistors SW1 and SW2. Damping is due, among other things, to the series resistance of the inductor winding Lm2. There is virtually no current flowing in the switches S1 and S2 and these are zero-voltage switching devices. There are therefore no switching losses.

The switching transistors SW1 and SW2 are seen as two capacitors in parallel. Given that there is no isolating diode, the voltage at these capacitors is present at all times across the transformer secondary. This voltage is seen by and imposed on the primary. This is possible because the transformer is fed from a current source rather than from a voltage source because of the presence of the inductor L1 which for this reason must have a sufficiently high value (for example L1=10 mH), i.e. the value of L1 must be high enough to convert the voltage source into a current source.

As a result the voltage and consequently the magnetizing current in the transformer are controlled by the secondary and at the same time the energy magnetizing the transformer can flow only in the load, i.e. on the secondary side because, on the primary side, the inductor L1 isolates the voltage source. The circuit is therefore a resonant circuit excited by generating the correct synchronization of the transformer using the switching devices S1 and S2.

The currents which flow in the secondary to charge and discharge the input capacitances of the switches SW1 and SW2 can be several orders of magnitude greater than those flowing through L1 and through the switching devices S1 and S2.

The switching time is the time at which the energy in the magnetizing inductance is maximal and the time at which a stationary state is obtained, i.e. the time at which the voltage across the capacitances is equal to zero, provided that the secondary frequency and the switching frequency are substantially equal. In this case the primary voltage at the switches S1 and S2 is equal to zero volts when switching takes place and there are therefore no switching losses.

The converter is thus an accumulation type converter which accumulates the magnetizing energy in the primary circuit and outputs it to the secondary circuit at the time S1 and S2 switch. It has the advantage as compared with standard converters that the output voltage is under the control of the circuit at all times. The waveform at the center tap CT is a rectified sinusoid which reflects the sinusoid across the secondary and its maximal amplitude is such that its mean amplitude is equal to the input voltage Vin under steady state conditions. To adjust the secondary voltage the turns ratio of the transformer is varied. For a supply voltage of 12 V, for example, a turns ratio of 6/4 produces a peak voltage of 13 V at the gate of transistors SW1 and SW2, and this is entirely adequate for driving them.

Note finally that, compared to the converter of the previously mentioned French patent application FR-A-2 658 674, the center tap CT of the invention is driven by a current source rather than by a voltage source (because of the inductor L1) and the waveform at the center tap CT is a rectified sinusoid (voltage Vcc in FIG. 5a), whereas in the aforementioned prior art this waveform is trapezoidal.

The converter of the invention is also distinguished from the previously mentioned French patent application FR-A-2 627 644 by the fact that the voltage Vd across S1 and S2 is a rectified semi-sinusoid (FIG. 5b), i.e. a waveform very different from that shown in FIG. 2b. The converter of application FR-A-2 627 644 operates in quasi-resonant mode. The control circuit of the prior art circuit consumes a high quantity of energy because of the energy that has to be mobilized to switch the gates of the MOS transistors.

FIG. 4 shows an equivalent circuit for FIG. 3 for half-wave operation, i.e. for a module having only one switch. Cds is the drain-source capacitance of the transistor S or an additional capacitor C shunting the latter and having a value of 100 pF (for example) if the switch is a bipolar transistor. Ip is the current flowing through the switching device S and Vd is the voltage across the latter. Vct is the voltage at the center tap CT. I1 is the current flowing through the inductor L1, Is is the current in the secondary winding and Vgs is the voltage across the gate-source capacitance Cgs of the secondary transistor. Lm1, Lm2 and L1 are the equivalent inductances of the transformer T, the resonant circuit comprising the magnetizing inductance Lm2 of the transformer secondary and the capacitance of the load, essentially the capacitance Cgs of the MOSFET SW1 and SW2.

FIGS. 5a through 5f show the timing diagrams of the signals Vct, I1, Ip, Vd, Is and Vs, respectively.

Note that in practice a small amount of secondary current is returned to the primary during switching. This is because there is a slight overlap in driving the switching devices S1 and S2 and the primary of T1 is short-circuited at this time. In this case all the magnetizing energy tends to flow back into the primary where the impedance is lower at this time (short-circuit). The current is then negative in one transistor and positive in the other. In any event, this current is limited to the maximum magnetizing current previously flowing in the secondary side resonant circuit (comprising the inductance Lm2 of the secondary winding and the capacitances Cgs in parallel).

The resonant circuit on the secondary side of the transformer T1 collects the additional magnetizing current which has accumulated in the primary during a half-cycle following on from switching from one switch device to the other. This is the reason for the small step in the secondary sinusoidal current is seen in FIG. 5e.

Given that the transformer T1 is supplied with current via the inductor L1, the primary must always have a path for this current to flow in, even on switching between S1 and S2. In the case of MOS transistors, the stray capacitance Cds provides this current path. If bipolar transistors are used, a shunt capacitor with a value in the order of 100 pF is added (C1 and C2).

FIG. 6 shows a converter in accordance with patent application FR-A-2 627 644 which produces from a low input voltage (between 3 V and 5 V) a high output voltage (from 50 V to 100 V) with an input current of up to 20 A at low voltage. Using a control circuit in accordance with the invention (FIG. 3) minimizes driving losses in the IRF 054 transistors. The voltage drop in the input switch is crucial to the efficiency of the converter. To obtain a low voltage drop each switch SW1 and SW2 uses one or more MOS transistors in parallel, in the present example three IRF 054 MOS transistors each of which has a series resistance of 9 nΩ. The switching frequency is high (250 kHz) enabling the use of a small transformer with only one primary winding. This minimizes resistive losses in the copper of the primary winding. In this way a primary resistance of 1 mΩ is obtained for each of the two oppositely-wound windings.

With a turns ration of 15, the secondary uses a full bridge as shown comprising four MOS transistors operating as a synchronous rectifier. In the application shown each IRF 150 MOS transistor has an input capacitance of 12 nF.

FIG. 7 shows a different embodiment of the invention exploiting the fact that the secondary voltage is under control at all times. The secondary of the transformer T has a winding Lms loaded by a capacitor Ct, Lms and Ct forming the secondary resonant circuit, and energy is transferred to an output capacitor C' via a forward-biased diode D. A load CH is connected across the output capacitor C'. This circuit configuration is usable for fly-back type converters in particular.

There is claimed:

1. A DC-DC converter comprising:
    a transformer having two oppositely-wound primary windings, one on each side of a center tap, and at least one secondary winding connected to a load having a first capacitance;
    a reference voltage source connected to said center tap of said transformer via an inductor so that said transformer is driven by a current source;
    two switching devices, each connected in a return path of said reference voltage, wherein said two switching devices are respectively connected in series with said primary windings; and
    control means for alternately and periodically connecting said return path of said reference voltage to one or other of said primary windings,
    wherein said control means comprises an oscillator generating squarewave signals and having two complementary outputs which are respectively connected to control terminals of said two switching devices, and
    wherein a frequency of said oscillator is substantially equal to a resonant frequency of a circuit comprising a secondary inductance of the transformer and said first capacitance of said load.

2. The DC-DC converter according to claim 1, wherein said switching devices are MOS field effect transistors and wherein an equivalent drain-source capacitance of said MOS field effect transistors constitutes a capacitance for storing energy in said input inductance during switching.

3. The DC-DC converter according to claim 1, wherein said switching devices are bipolar transistors, wherein each of said bipolar transistors have a capacitor connected between a collector and an emitter of said bipolar transistors, and wherein said capacitor has a capacitance for storing energy in said input inductance during switching.

4. The DC-DC converter according to claim 1, wherein said load is a capacitive load.

5. The DC-DC converter according to claim 4, wherein said capacitive load is a gate-source capacitance of a power MOSFET.

6. The DC-DC converter according to claim 1, wherein said load includes a resonant circuit comprising a resonant circuit capacitor connected in parallel with said secondary winding.

7. The DC-DC converter according to claim 6, wherein said load further comprises an output capacitor connected across said resonant circuit capacitor via a forward-biased diode.

8. The DC-DC converter as claimed in claim 1, wherein said two complementary outputs are connected directly to said control terminals of said two switching devices, respectively.

9. The DC-DC converter as claimed in claim 1, wherein said two switching devices are alternatively and periodically switched at a frequency which corresponds to said frequency of said oscillator.

10. The DC-DC converter as claimed in claim 9, wherein said two switching devices are alternatively and periodically switched at a frequency which substantially equals said frequency of said oscillator.

11. The DC-DC converter as claimed in claim 1, wherein said secondary inductance is determined by said at least one secondary winding of said transformer.

12. A DC-DC converter module comprising:
    a transformer comprising a primary winding having first and second terminals and at least one secondary winding connected to a load having a first capacitance;
    a reference voltage source having a first terminal which is connected to said first terminal of said primary winding via an inductance so that said transformer is driven by a current source;
    a switching device connected in series between a second terminal of said reference voltage source and said second terminal of said primary winding; and
    control means for periodically connecting said second terminal of said reference voltage source to said second terminal of said primary winding,
    wherein said control means comprises an oscillator which outputs squarewave signals via an output,
    wherein said output is connected to a control terminal of said switching device, and
    wherein a frequency of the oscillator is substantially equal to a resonant frequency of a circuit comprising the inductance of said secondary winding and said first capacitance of said load.

13. The DC-DC converter module as claimed in claim 12, wherein said output of said control means is connected directly to said control terminal of said switching device.

14. The DC-DC converter as claimed in claim 12, wherein said switching device is periodically switched at a frequency which corresponds to said frequency of said oscillator.

15. The DC-DC converter as claimed in claim 14, wherein said switching device is periodically switched at a frequency which substantially equals said frequency of said oscillator.

16. The DC-DC converter as claimed in claim 12, wherein said secondary inductance is determined by said at least one secondary winding of said transformer.

17. A voltage converter comprising:
    a transformer having a first primary winding, a second primary winding, and at least one secondary winding, wherein said first and second primary windings are oppositely wound and are respectively disposed on different sides of a center tap and wherein said secondary winding is connected to a load having a first capacitance;
    a reference voltage source for outputting a reference voltage to drive said transformer;
    a first switching device which is connected in series with said first primary winding and which selectively supplies a first output of said first primary winding to a first voltage potential terminal;

a second switching device which is connected in series with said second primary winding and which selectively supplies a second output of said second primary winding to said first voltage potential terminal;

control device which is adapted to control said first and second switching devices such that said first and second outputs are periodically and alternatively supplied to said first voltage potential terminal, wherein said control device comprises an oscillator which generates a first signal and a second signal which is complementary to said first signal, wherein said first and second signals are respectively supplied to first and second control terminals of said first and second switching devices, and wherein an oscillator frequency of said oscillator is substantially equal to a resonant frequency of a circuit comprising a secondary inductance of the transformer and said first capacitance of said load.

18. The converter as claimed in claim 17, wherein said first and second signals are directly supplied to first and second control terminals of said first and second switching devices, respectively.

19. The converter as claimed in claim 17, wherein said first and second switching devices are alternatively and periodically switched at a frequency which corresponds to said oscillator frequency.

20. The converter as claimed in claim 19, wherein said first and second switching devices are alternatively and periodically switched at a frequency which substantially equals said oscillator frequency.

21. The converter as claimed in claim 17, further comprising:

an inductor connected between said reference voltage source and said center tap so that said transformer is driven by a current source.

22. The converter as claimed in claim 17, wherein said first signal comprises a first squarewave signal and wherein said second signal comprises a second squarewave signal.

23. The converter as claimed in claim 17, wherein said secondary inductance is determined by said secondary winding of said transformer.

* * * * *